(12) United States Patent
Stehle et al.

(10) Patent No.: US 10,081,039 B2
(45) Date of Patent: Sep. 25, 2018

(54) RODABLE PRESSURE COUPLING

(71) Applicant: Dieterich Standard, Inc., Boulder, CO (US)

(72) Inventors: John Henry Stehle, Boulder, CO (US); Nathaniel Kirk Kenyon, Boulder, CO (US); Bryce Arthur Bingham, Boulder, CO (US); Gregory Robert Strom, Boulder, CO (US)

(73) Assignee: DIETERICH STANDARD, INC., Boulder, CO (US)

( * ) Notice: Subject to any disclaimer, the term of this patent is extended or adjusted under 35 U.S.C. 154(b) by 0 days.

(21) Appl. No.: 14/871,901

(22) Filed: Sep. 30, 2015

(65) Prior Publication Data
US 2016/0175897 A1 Jun. 23, 2016

Related U.S. Application Data

(60) Provisional application No. 62/174,885, filed on Jun. 12, 2015, provisional application No. 62/093,725, filed on Dec. 18, 2014.

(51) Int. Cl.
*B08B 9/027* (2006.01)
*G01F 15/12* (2006.01)
(Continued)

(52) U.S. Cl.
CPC ............ *B08B 9/027* (2013.01); *F16L 45/00* (2013.01); *G01F 15/12* (2013.01); *G01F 15/185* (2013.01); *G01L 19/0007* (2013.01)

(58) Field of Classification Search
CPC ......... B08B 9/027; G01F 15/12; G01F 15/18; G01F 15/185; G01L 19/0007; F16L 45/00
(Continued)

(56) References Cited

U.S. PATENT DOCUMENTS 5,668,322 A * 9/1997 Broden ............... G01L 19/0015
137/798
5,720,317 A * 2/1998 Nimberger ............. F16K 11/22
137/557
(Continued)

FOREIGN PATENT DOCUMENTS

CN 2754075 1/2006
CN 1788189 6/2006
(Continued)

OTHER PUBLICATIONS

Notification of Transmittal of the International Search Report and the Written Opinion of the International Searching Authority from PCT/US2015/064188, dated Mar. 11, 2016.
(Continued)

*Primary Examiner* — Ian Paquette
(74) *Attorney, Agent, or Firm* — Westman, Champlin & Koehler, P.A.

(57) ABSTRACT

A pressure transmitter coupling for coupling a pressure transmitter to a process fluid includes a process coupling face having a process coupling port configured to couple to impulse piping. A pressure transmitter coupling face is arranged at an angle to the process coupling face, the pressure transmitter coupling face including a pressure transmitter coupling port configured to fluidically couple to the pressure transmitter. A process fluid passageway extends between the process coupling port and the pressure transmitter coupling port. A rod out port is aligned with the process fluid coupling port and configured to receive a cleaning rod therethrough to clean the process coupling port.

13 Claims, 14 Drawing Sheets

(51) Int. Cl.
*G01F 15/18* (2006.01)
*F16L 45/00* (2006.01)
*G01L 19/00* (2006.01)

(58) Field of Classification Search
USPC ......... 137/15.01, 15.07, 242, 244, 861, 884; 73/861.61, 756, 861.42
See application file for complete search history.

(56) References Cited

U.S. PATENT DOCUMENTS

| | | | | |
|---|---|---|---|---|
| 5,868,155 | A * | 2/1999 | Hutton | G01F 1/36 137/240 |
| 6,009,758 | A * | 1/2000 | Petrich | F16K 27/0263 137/597 |
| 6,272,931 | B1 * | 8/2001 | Nimberger | G01L 19/0015 73/756 |
| 6,868,741 | B2 | 3/2005 | Harman | |
| 6,918,303 | B2 * | 7/2005 | Casimiro | G01L 19/0007 73/706 |
| 7,231,831 | B1 * | 6/2007 | Lancaster | G01L 19/0015 137/15.09 |
| 8,684,023 | B2 | 4/2014 | Deegan et al. | |
| 9,151,648 | B2 * | 10/2015 | Strom | G01F 1/42 |
| 2013/0098469 | A1 | 4/2013 | Deegan et al. | |

FOREIGN PATENT DOCUMENTS

| | | |
|---|---|---|
| CN | 103063258 | 4/2013 |
| JP | 2014-531006 | 11/2014 |
| WO | WO 97/22855 | 6/1997 |

OTHER PUBLICATIONS

"Direct-Mount Systems for the Gas Industry", Catalog DMS 3-03, PGI International, pp. 1-30, 2005.

Office Action from European Patent Application No. 15812914.8, dated Jul. 25, 2017.

Office Action from Chinese Patent Application No. 201510953091.5, dated Jan. 2, 2018.

Office Action from Canadian Patent Application No. 2,971,388, dated May 2, 2018.

Office Action from Japanese Patent Application No. 2017-533014, dated Jun. 6, 2018.

Communication from European Patent Application No. 15812914.8, dated Jul. 17, 2018.

Office Action from Chinese Patent Application No. 2015109530915, dated Jul. 11, 2018.

* cited by examiner

RODABLE PRESSURE COUPLING

CROSS-REFERENCE TO RELATED APPLICATION

The present application is based on and claims the benefit of U.S. provisional patent application Ser. No. 62/093,725, filed Dec. 18, 2014 and U.S. provisional patent application Ser. No. 62/174,885, filed Jun. 12, 2015, the contents of which are hereby incorporated by reference in their entirety.

BACKGROUND

The present invention relates to coupling pressure transmitters to an industrial process fluid. More specifically, the invention relates to a rodable coupling for such a configuration.

Industry has long used differential pressure (DP) flow measurement technologies for process monitoring and control because it is reliable, delivers accurate measurements, and leverages well understood pressure measurement instrumentation. The benefits of DP flow measurement make it the most common flow measurement technology. It is often successfully utilized in applications with less than ideal characteristics.

Process fluids that are viscous, include entrained solids, or have a tendency to solidify are examples of marginal applications where DP flow measurement may be difficult to implement. Refinery process fluid measurements are particularly challenging. The fluid flowing in these applications is highly viscous when not heated to very high temperatures. Impulse tubes both carry the pressure induced across a primary element and reduce fluid temperature to an acceptable level for differential pressure measurement. These fluids can plug the impulse tube and cause the pressure signal to the transmitter to be attenuated or eliminated. A plugged impulse tube is difficult to diagnose and may go unnoticed by the customer resulting in measurement problems and lost revenue.

Operators address these issues in difficult applications by "rodding-out" impulse tubes. This is accomplished by opening a port at the end of an impulse tube and inserting a tool such as a metal rod or drill point. The rod is forced through any obstruction thereby clearing the impulse tube. Traditional orifice plate installations that allow this practice are commonly referred to as being "rodable".

Some flow meter configurations are not rodable for several reasons. The impulse tubes between the head and the sensor may be constructed of small diameter tubes which are too small for robust tools to fit inside them. Additionally, the thin tubes may not be straight, and may follow a curved path between the head and the process connection. Further, the transmitter may be mounted on top of the impulse tubes thereby eliminating the possibility of mounting the fittings that would allow access for the rodding tools.

SUMMARY

A pressure transmitter coupling for coupling a pressure transmitter to a process fluid includes a process coupling face having a process coupling port configured to couple to impulse piping. A pressure transmitter coupling face is arranged at an angle to the process coupling face, the pressure transmitter coupling face including a pressure transmitter coupling port configured to fluidically couple to the pressure transmitter. A process fluid passageway extends between the process coupling port and the pressure transmitter coupling port. A rod out port is aligned with the process fluid coupling port and configured to receive a cleaning rod therethrough to clean the process coupling port.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Differential Pressure (DP) flow measurement is widely accepted in broad range of applications. Some devices may exhibit performance issues when used in applications that may clog the sensor ports. A "rodable" design is provided that allows for more reliable measurement and easier maintenance in these conditions. Several design features are provided to create a flow meter that will mitigate plugging and allow easy cleaning of the ports if necessary.

The process control and monitoring industry has long used Differential Pressure, or DP, flow measurement technologies for process monitoring and control due to its reliability, accurate measurements, and similarity to pressure measurement instrumentation. The benefits of DP flow measurement make it one of the most common flow measurement technology, often lending itself to successful implementation even in applications with less than ideal characteristics.

Measurement applications involving process fluids that are viscous or those which contain precipitate solids are examples of marginal applications where DP flow measurement may be difficult to implement. Specifically, water injection applications in natural gas production and "dirty" steam applications can present technical problems, where impulse tube plugging can cause the pressure signal to the transmitter to be attenuated or eliminated. A plugged impulse tube is difficult to diagnose and may go unnoticed by an operator resulting in measurement errors.

Some operators address this issue in difficult applications by "rodding out" impulse tubes. This is accomplished by opening a port at the end of an impulse tube and inserting a metal rod. The rod is forced through any obstruction in the tube thereby clearing the impulse tube. Traditional orifice plate installations that allow this practice are commonly referred to as being "rodable".

Figure 1A:
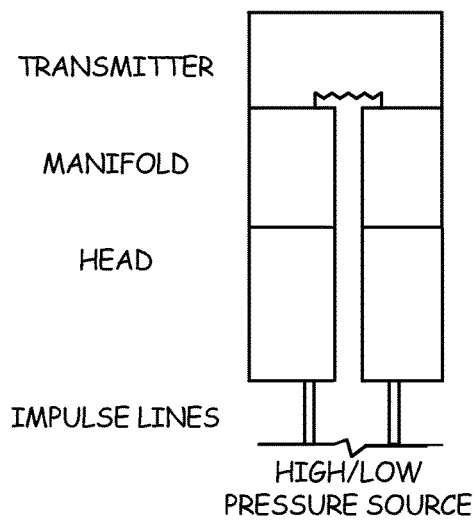
FIG. 1A is a simplified block diagram showing a traditional configuration of a pressure transmitter coupled to a process fluid configured to measure a pressure of the process fluid.
Figure 1B:
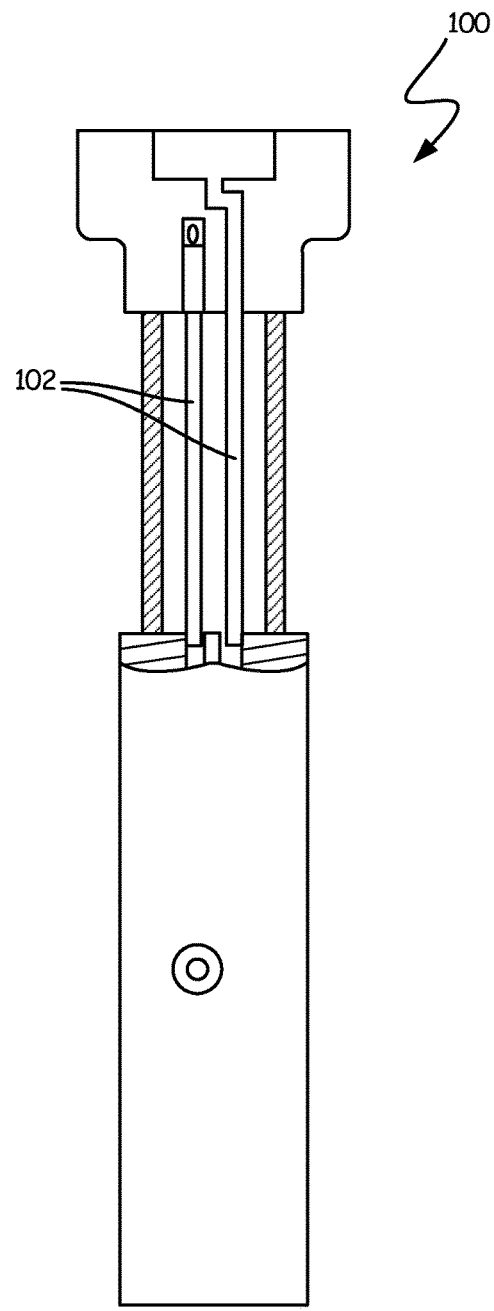
FIG. 1B is a side partial cross-sectional view of a traditional integrated orifice plate configuration.

Some integrated flow meters configurations are not commonly used in refinery process applications in part because they are not rodable. Instead, refineries may use traditional orifice configuration with ½ inch diameter impulse tubes spaced 2⅛ inches on centers. These configurations allow for rodding and meet requirements defined in ISO 5167. Some legacy integral flow meters are arranged so that the impulse tubes, head, manifold, and transmitter are oriented along an axis as shown in the simplified block diagram of FIG. 1A. FIG. 1B is a side partial cross-sectional view of an integral orifice plate 100 in a similar arrangement. As illustrated in FIG. 1B, the impulse tubes 102 are not completely straight. These are examples of arrangements that eliminate the potential for rodability.

Figure 2:
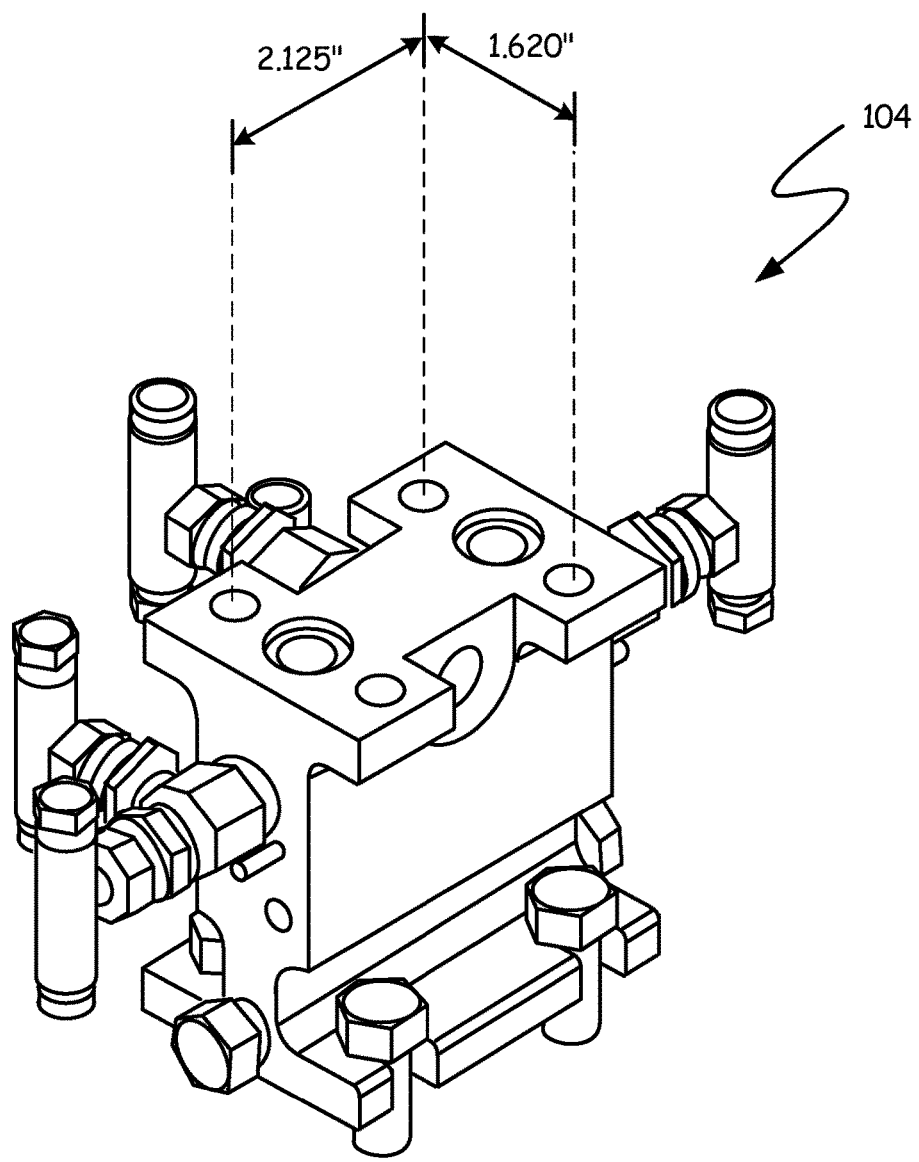
FIG. 2 is a perspective view of an industry standard manifold arrangement used for connecting a pressure transmitter to a process fluid.

Another reason for the limited adoption of some integrated flow meters in refinery applications is the lack of root valves. Many refinery operators use OS&Y (Outside Stem and Yoke) root valves in process applications. Clearance for these valves requires 2⅛ inch centers. The studs and nuts on some DP sensor modules and on industry standard manifolds are also spaced on 2⅛ inch centers which preclude clearance for impulse tubes. FIG. 2 shows the positioning of process and transmitter connections on an industry standard manifold 104.

According to an embodiment, a pressure transmitter coupling design used to mate a primary element (flow obstruction) with a secondary element (pressure measurement device such as a pressure transmitter) for differential pressure (DP) flow measurement is provided. The configuration allows piping-class primary isolation through the impulse lines and the ability to rod out the impulse lines to clear debris in applications such as refinery and steam applications. One configuration is a rodable head design which utilizes flange-tap spacing between centerlines of the pressure taps and uses a standard manifold bolt-hole mating pattern. Another example configuration incorporates large ports, linear impulse tube geometry, a 90 degree transmitter connection head, and optional full-port root valves into an integrated flow meter. This allows operators to obtain reliable and accurate measurements even in marginal applications. For example, the standard 0.157 inch impulse tubes 102 shown in FIG. 1B may be replaced in some designs with ⅜ inch or greater internal diameter impulse tubes. This larger diameter reduces the potential for plugging and mitigates the impact of solid accumulation of deposits inside the tubes. Lab testing has verified ⅜ inch is the smallest inner diameter that drains fully under capillary conditions. Note that these larger impulse tubes can prevent the implementation from conforming to the ISO 5167 standard for orifice plate design. However, testing has shown that calibration can be used to correct for any resultant errors. By fixing the manifold orientation at 90° with respect to the impulse lines, rod-out capability is achieved. An additional benefit of this 90° angle is that the moment arm associated with the mass of the transmitter and manifold is reduced which mitigates stresses on impulse lines.

Figure 3A:
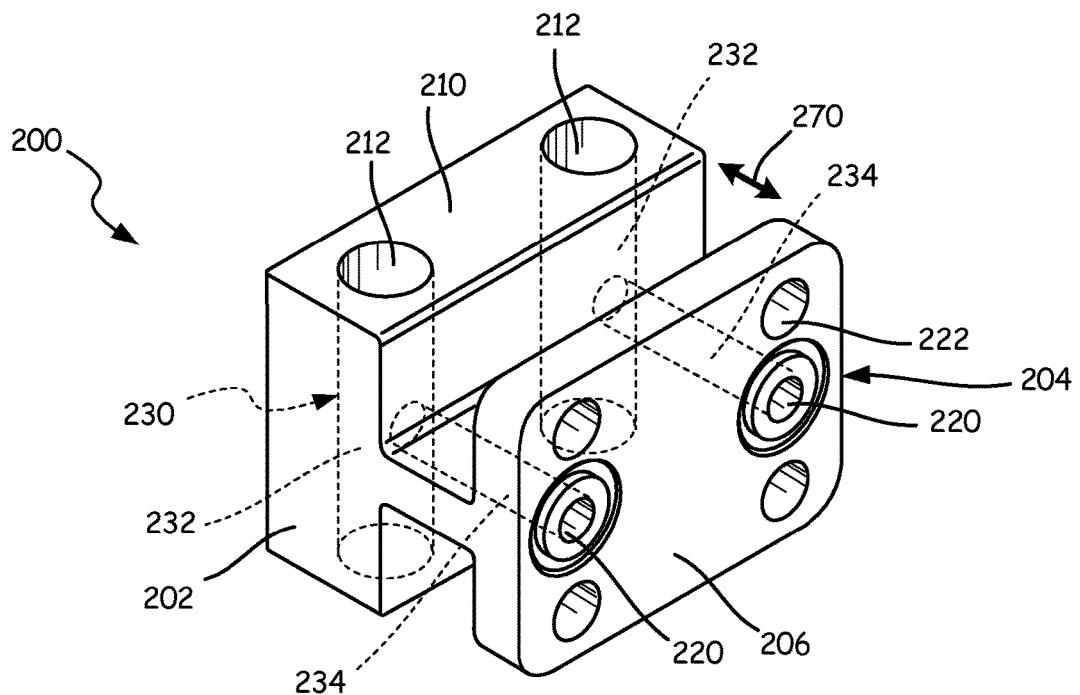
FIGS. 3A and 3B are perspective views of a pressure transmitter coupling or "head" for use in coupling a pressure transmitter to impulse piping lines at an angle.
Figure 3B:
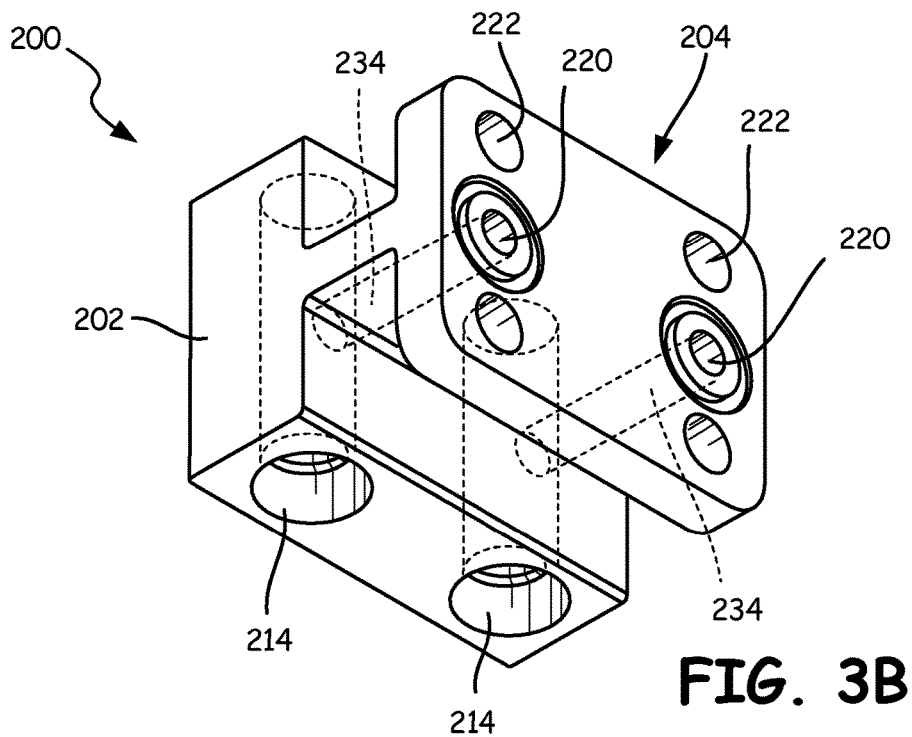

FIG. 3A is a top perspective view and FIG. 3B is a bottom perspective view of a differential pressure head 200 in accordance with one example embodiment. Differential pressure head 200 includes a main body portion 202 and a connection flange 204 having a coupling face 206. As discussed below, connection flange 204 may also be integrated with main body 202. A top face 210 of main body 202 includes rod out ports 212 which may optionally be threaded. Rod out ports 212 extend through the main body 202 to impulse connections 214 through internal conduits 232. Coupling face 206 includes pressure coupling ports 220 and bolt holes 222. Further, an optional recessed region is illustrated which extends around ports 220 for use in providing a sealed connection, for example with a gasket. Conduits 232 extend between impulse connections 214, rod-out ports 212 and pressure coupling ports 220. Conduits 230 include a straight portion 232 which extend between rod-out ports 212 and impulse connections 214. Further, conduits 230 include "T" portions 234 which extend from straight portions 232 to the pressure coupling ports 220.

Figure 4:
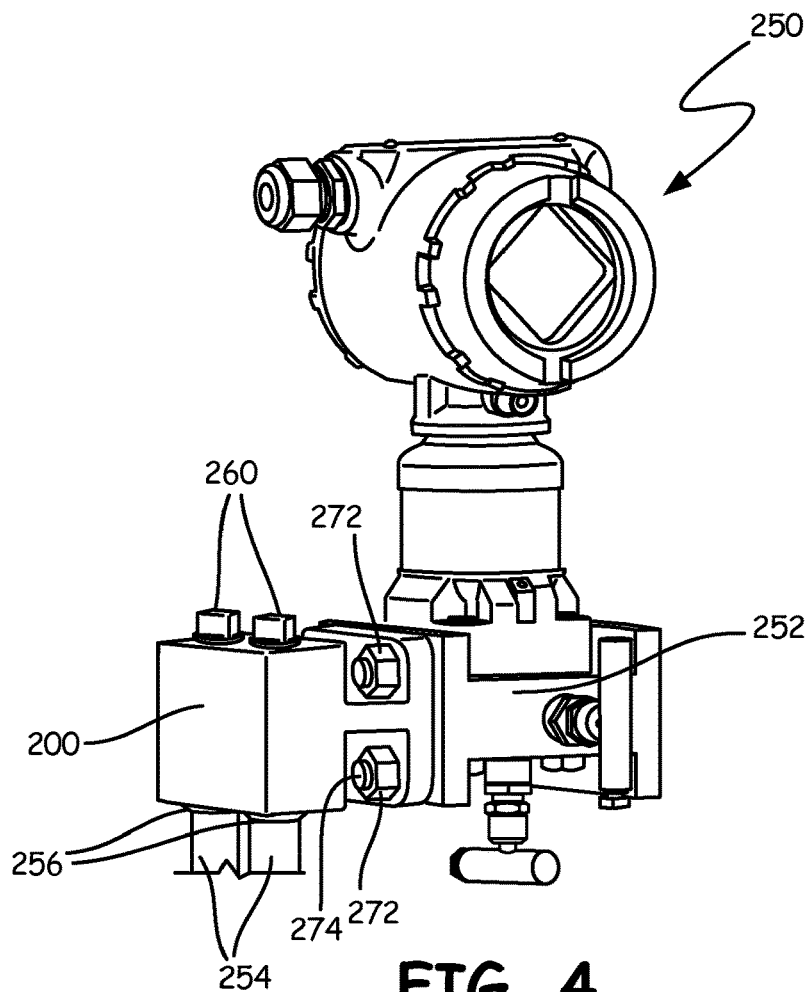
FIG. 4 is a side perspective view of a pressure transmitter coupled by a flange manifold to the coupling of FIGS. 3A and 3B.
Figure 5:
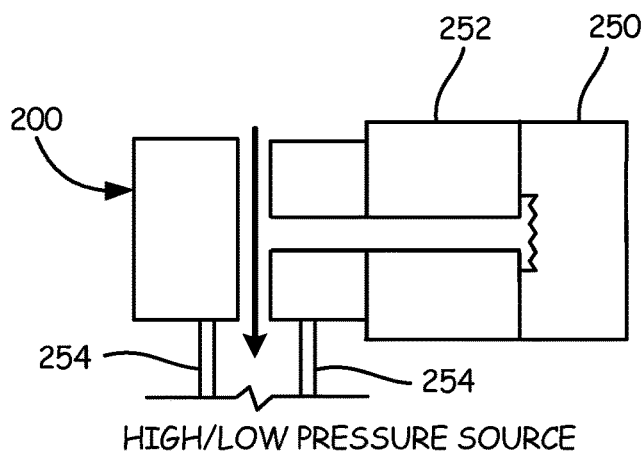
FIG. 5 is a simplified block diagram showing a pressure transmitter coupling to the coupling of FIGS. 3A and 3B.

FIG. 4 is a perspective view of a pressure transmitter 250 mounted to the differential pressure head 200 using an industry standard valved connection flange or manifold 252. As illustrated in FIG. 4, differential pressure head 200 is coupled to impulse tubing (also called impulse piping or impulse conduits) 254, for example, using welds 256. Other connection techniques may also be employed such as threading. Threadable plugs 260 are threadably received in rod-out ports 212 to thereby seal the rod-out ports 212. Referring back to FIG. 3A, sufficient spacing 270 is provided between the main body 202 and the connection flange 204 to allow nuts 272 to couple to bolts 274 to thereby secure the flange 252 to the connection flange 204. The connection flange or manifold 252 includes optional valves for selectively opening and closing pressure connections between the transmitter 250 and the process connections provided by impulse tubing 254, as well as an optional equalization valve in accordance with known configurations. The bolt-hole pattern intersection with the internal conduit 230 is mitigated by gap 270 that accommodates manifold connection nuts 272. The embodiment allows room for the nut 272 in its tightened position, as well as room for the nut 272 to be installed or removed easily with a box end or open end wrench. The illustrated configuration includes enough space for piping class fittings to be socket welded per applicable code (ASME B31.1/B31.3). FIG. 5 is a simplified block diagram showing the rod out port extending through the impulse tubing 254. As noted in FIG. 5, the impulse tubing extends to a primary element such as an orifice plate which creates a differential pressure as process fluid flows past the primary element.

Figure 6:
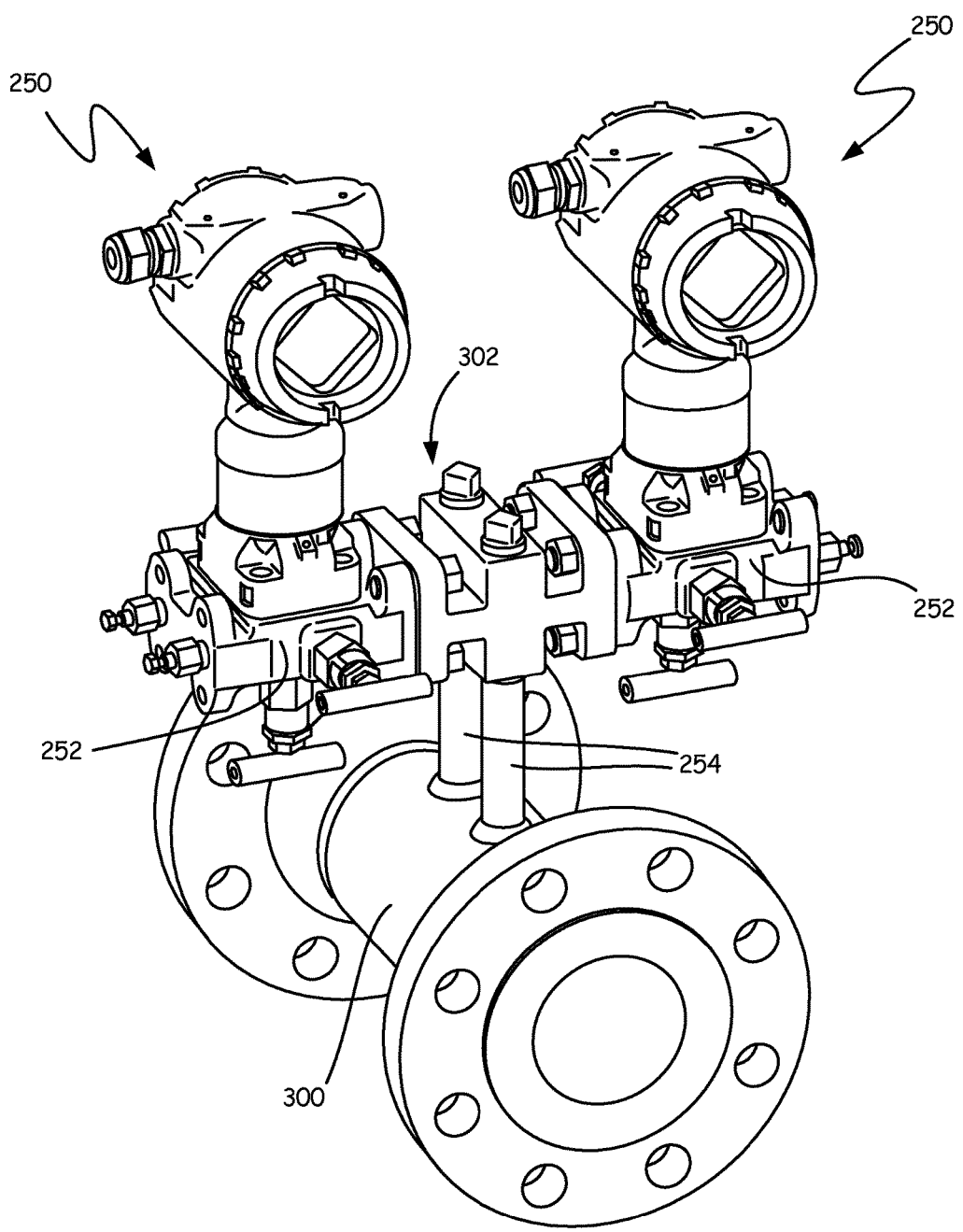
FIG. 6 is a perspective view showing two pressure transmitters connected to a process fluid through a coupling.

FIG. 6 is a perspective view of another example configuration in which a dual differential pressure head 302 is employed for connecting two transmitters 250 to a process fluid. Additionally, FIG. 6 illustrates one example of a process conduit 300 which carries a flow of process fluid as it moves past the primary element. This configuration with two transmitters 250 can be used to provide redundant measurements or additional diagnostic functionality.

Figure 7:
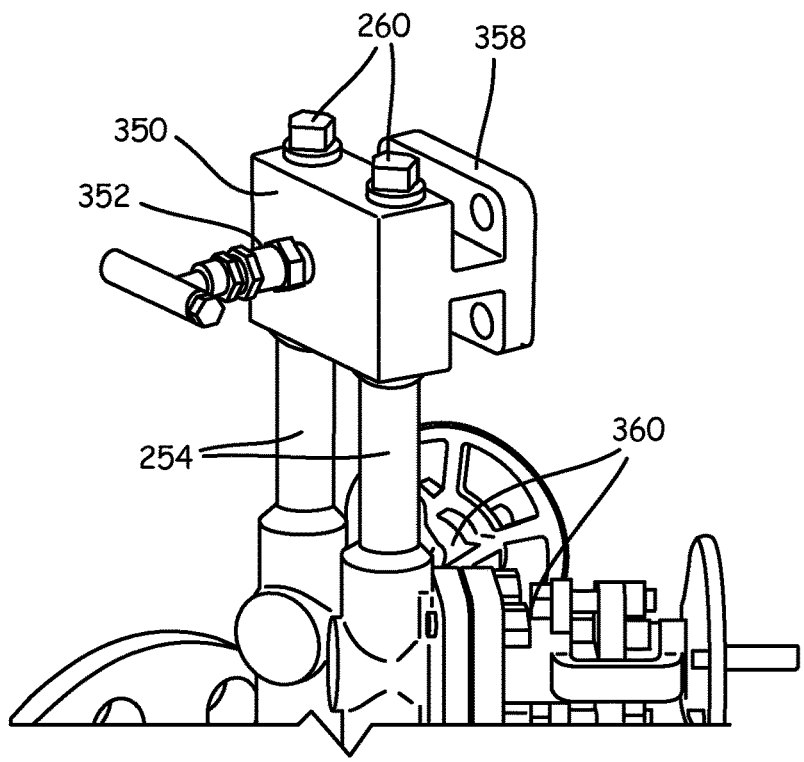
FIG. 7 is a perspective view showing a pressure transmitter coupling including an integral equalizer valve.

FIG. 7 is a perspective view of another example configuration of differential pressure head 350. In the configuration of FIG. 7, a equalization valve 352 is provided to allow equalization of the pressure between conduits 254. In such a configuration, the transmitter 250 may be directly coupled to the connection flange 358 of head 350. Additional valves, such as in-line blocking valves may also be provided. Additional piping class isolation valves 360 may be placed in line with the impulse tubing 254 to thereby provide isolation between the pressure transmitter 250 and the high and low pressure sides of the process coupling. These can be configured as full port root valves to allow process isolation while maintaining rodability.

The lower impulse tube includes a tapered feature that ensures conformance to ISO 5167 impulse tube dimensional requirements (ID and concentricity). Simultaneously, this feature facilitates rod out tool alignment with impulse tube. The angle of the restriction is between 5 and 10 degress (and 7 degrees in one specific configuration) for optimal utility. The length of the straight section of tube past the restriction combined with the matching body through hole bore ensure conformance with impulse tube dimensional requirements.

Figure 8:
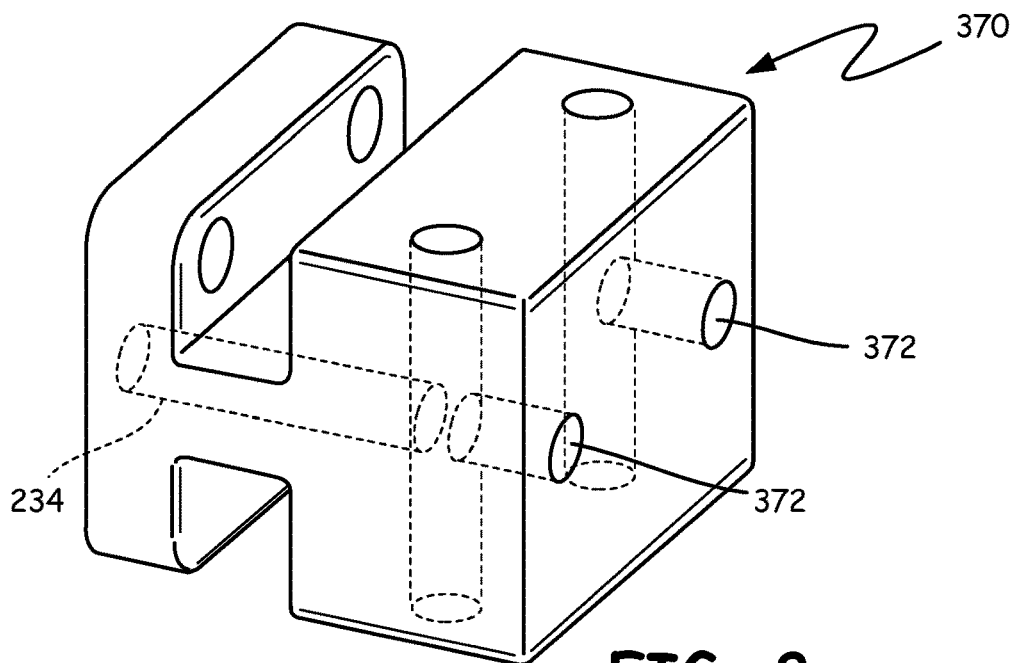
FIG. 8 is a perspective view of a pressure transmitter coupling including rod out ports for use in cleaning a passageway of the coupling which couples to a manifold or pressure transmitter.

In some environments, it may be possible for the T portion 234 illustrated in FIG. 3A to become clogged. In the configuration illustrated in FIG. 8, a differential pressure head 370 is illustrated in which rod out ports 372 are provided for clearing T portions 234 of debris. Ports 372 may be threaded so that they can be sealed during normal operation.

Figure 9:
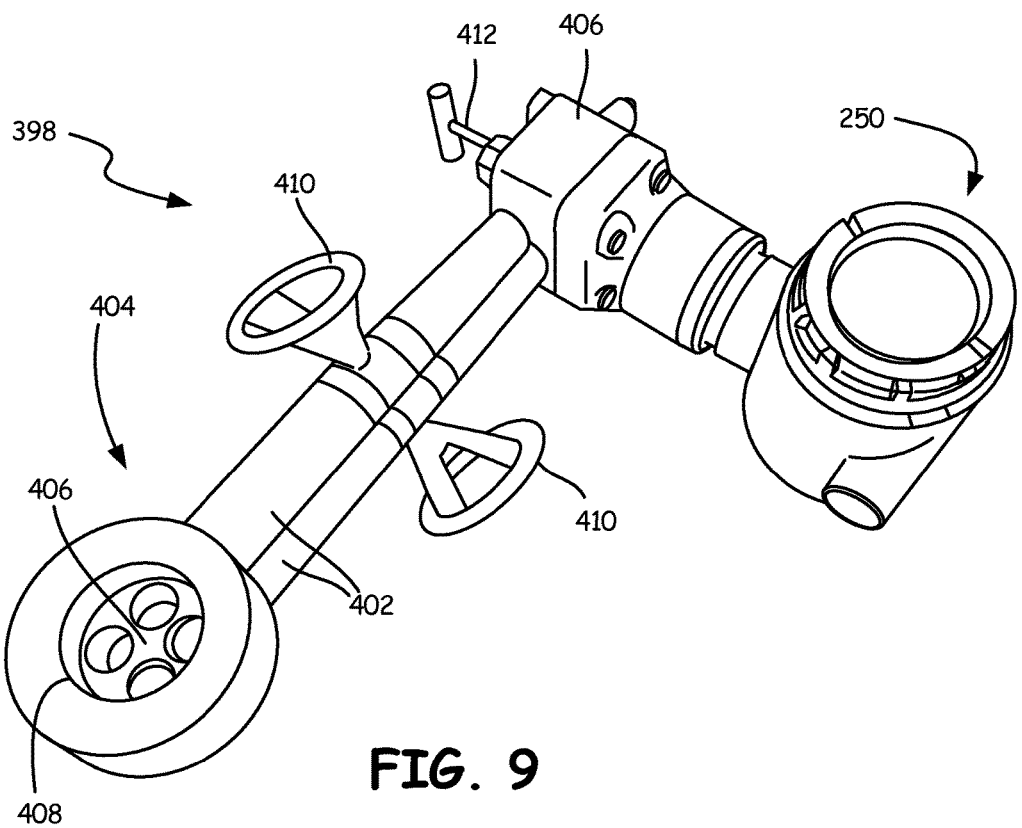
FIG. 9 is a perspective view and FIG. 10 is a side plan view of configurations of a pressure transmitter coupling formed with an integrated orifice plate.
Figure 10:
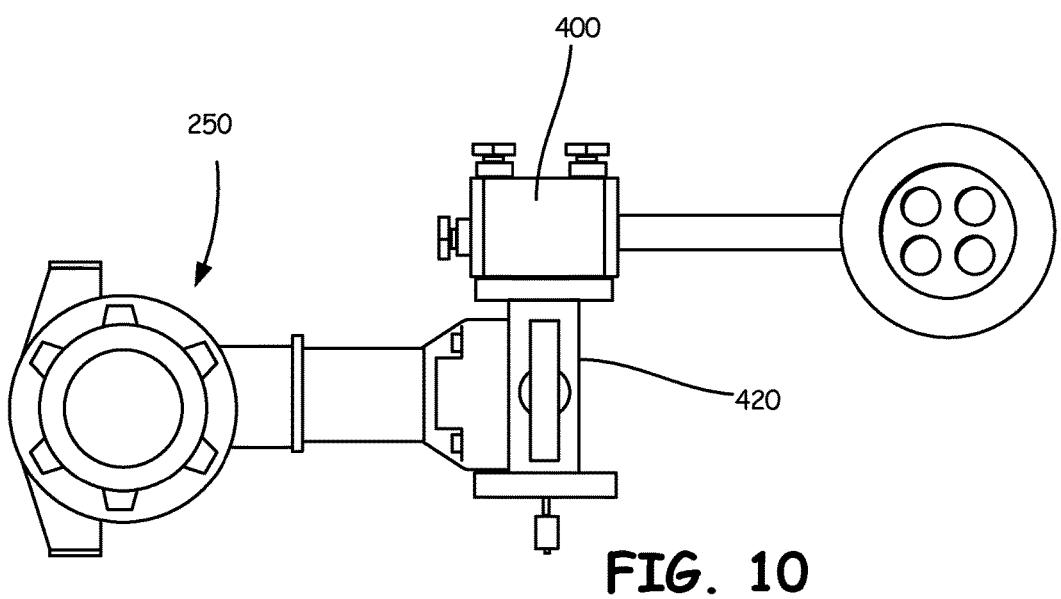

The differential pressure head configuration discussed herein may also be implemented in a configuration with an integrated orifice plate 398 such as that illustrated in FIG. 9. In FIG. 9 a differential pressure head 400 is mounted to neck portion 402 of integrated orifice plate 398 which carries the impulse tubing 254 illustrated in FIG. 4. Neck portion 402 couples to an integrated orifice plate assembly 404 in which an orifice plate 406 is carried in a conduit portion 408. In the configuration of FIG. 9, isolation valves 410 are preferably provided as well as a equalization valve 412 as discussed above. FIG. 10 shows another example configuration in which a valved flange 420 is used for coupling the pressure transmitter 250 to the differential pressure head 400.

Figure 11:
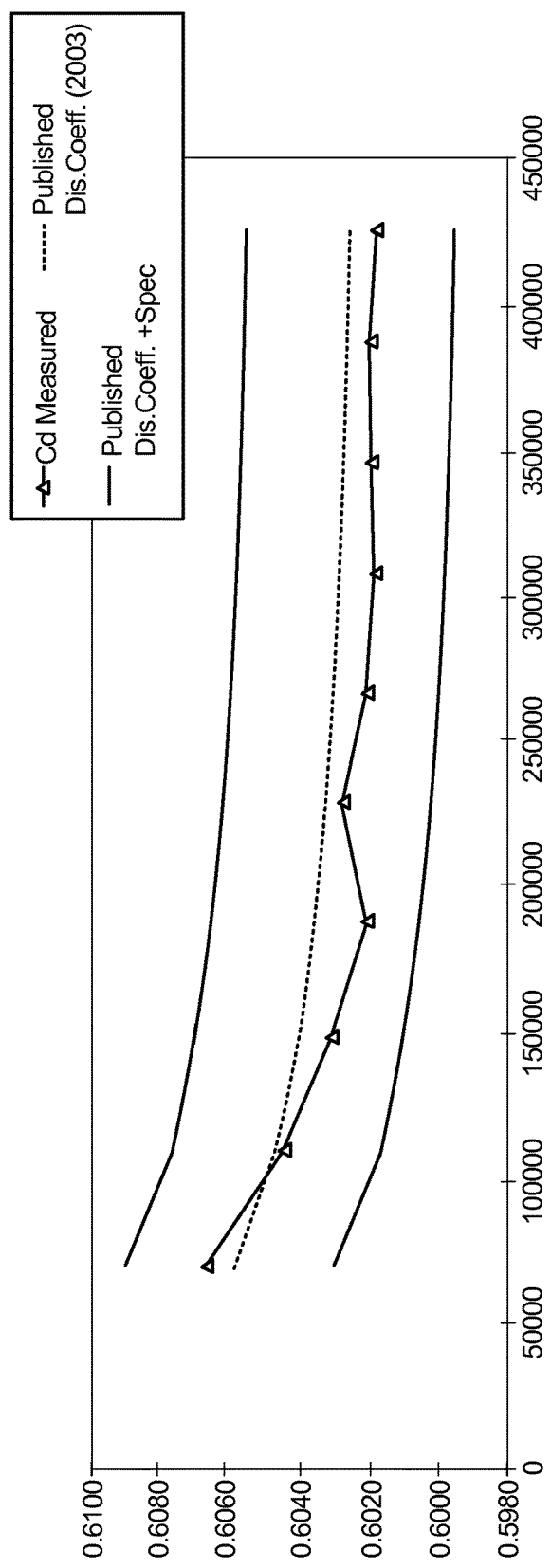
FIGS. 11 and 12 are graphs showing calibration of discharge coefficients for various configurations of a pressure transmitter coupling.
Figure 12:
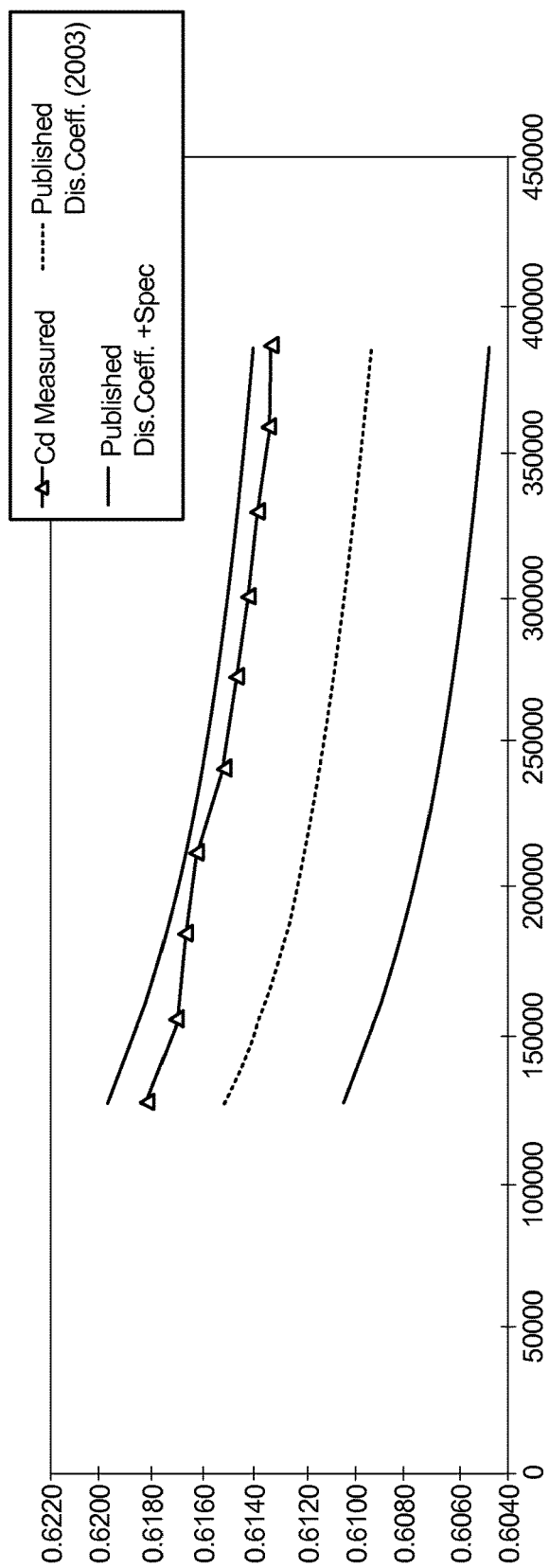

As mentioned above in connection with FIG. 1B, larger size impulse tubes 254 may prevent the configuration from conforming to some standards such as the ISO 5167 standard for orifice plate designs. FIGS. 11 and 12 are graphs of Discharge Coefficient versus Pipe Reynolds Number showing the measured discharge coefficient Cd prepared to industry standard specifications and illustrate examples of calibration of orifice plates with enlarged impulse tubes. FIG. 11 is for a 6" 0.4 Beta conditioning orifice plate and illustrates a typical calibration plotted against an ISO standard curve. FIG. 12 shows a calibration of a worst case scenario for a 1.5" diameter wafer with a single orifice hole. Even in this worst case scenario only a 0.6% bias from the standard ISO curve was measured.

Figure 13A:
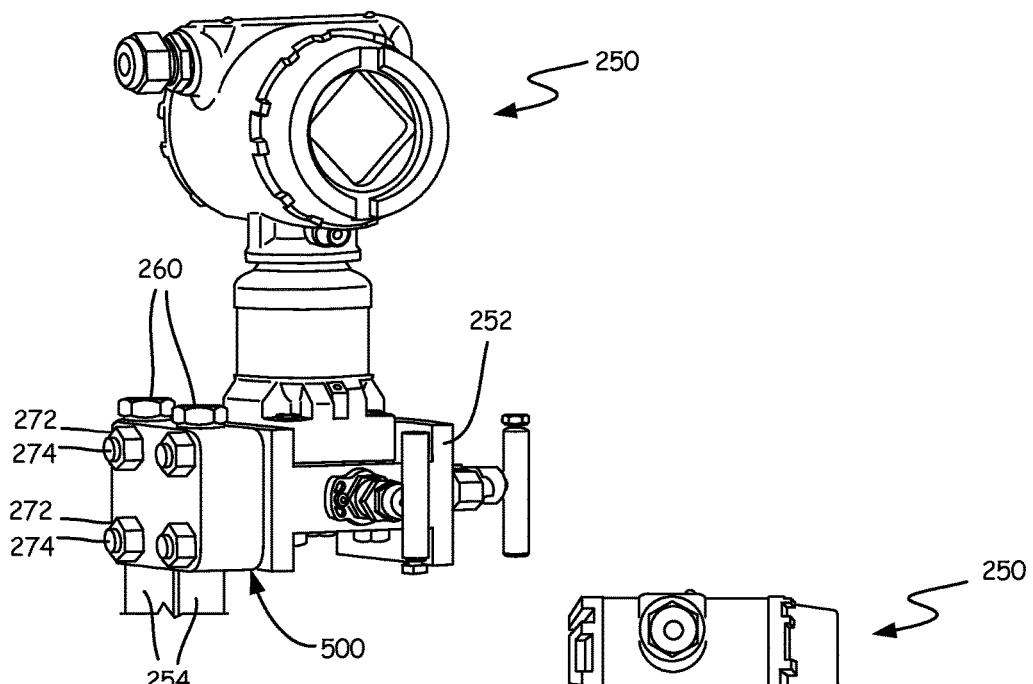
FIG. 13A is a side perspective view and FIG. 13B is a side plan view of a compact pressure transmitter coupling.
Figure 13B:
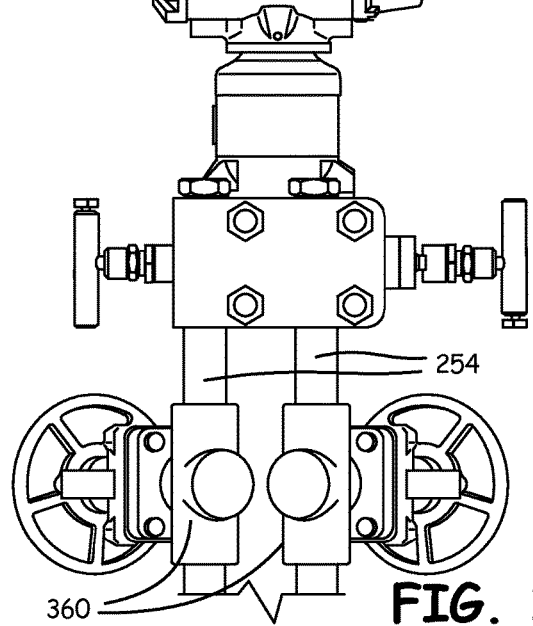

The differential pressure head may be arranged in other configurations than those discussed above. For example, a more compact differential pressure head 500 is illustrated in FIGS. 13A and 13B. Differential pressure head 500 is illustrated as coupling impulse piping 254 to pressure transmitter 250 through manifold 252. Note that in this configuration, the gap 270 illustrated in FIG. 3A is not required and the bolts 274 extend completely through the differential pressure head 500 for connecting to nuts 272. In these configurations, the connection flange 204 shown in FIGS. 3A, 3B is formed integrally with the main body 202.

Figure 14A:
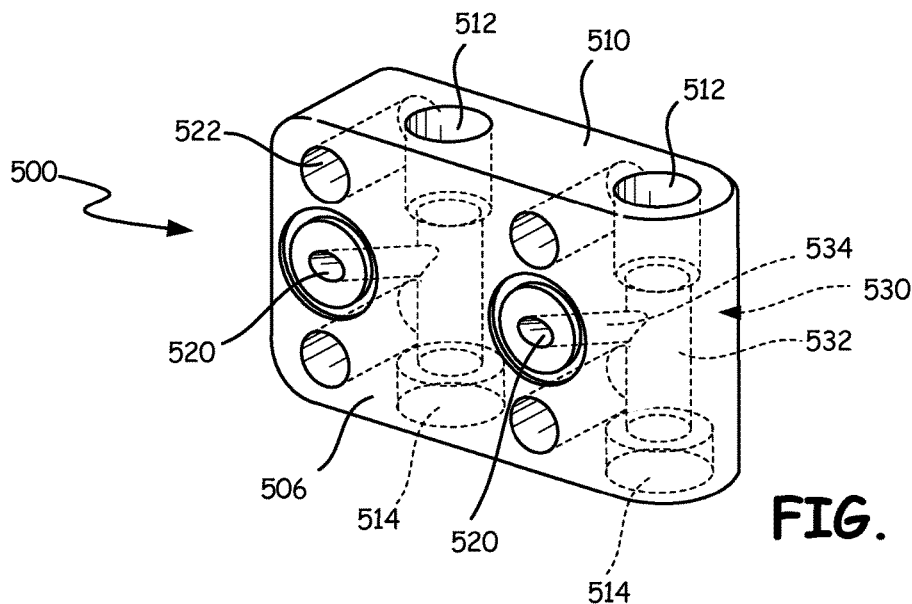
FIG. 14A is a perspective view.
Figure 14B:
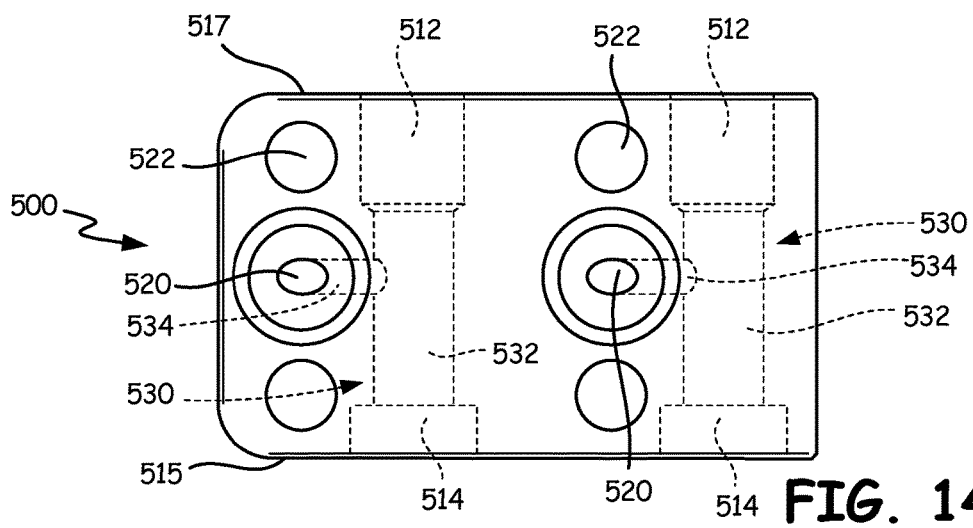
FIG. 14B is a front plan view and FIG. 14C is a bottom plan view of the compact pressure transmitter coupling shown in FIGS. 13A and 13B and also show internal passageways in phantom.
Figure 14C:
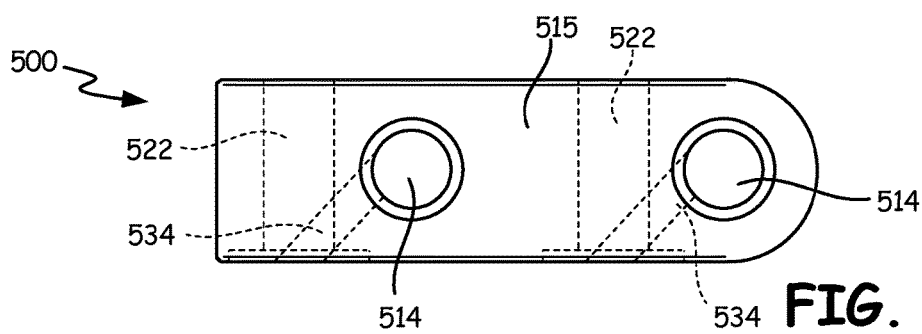

FIG. 14A is a front perspective view, FIG. 14B is a front plan view and FIG. 14C is a bottom plan view of the compact differential pressure head 500 which shows internal conduits in phantom. As illustrated in these figures, the differential pressure head 500 includes a coupling face 506 for coupling to the flange 252 (or directly to a transmitter 250). Impulse tube connectors 514 are provided on a bottom face 515 of the head 500. Internal conduits 530 include straight portions 532 which extend from the impulse tube connectors 514 to rod out ports 512 which are carried on a top face 510 of the head 500. The internal conduits 530 also include "T" portions 534 which extend from the straight portion 532 to ports 520 carried on the coupling face 506. The illustration also shows an optional circumferential depression around ports 520 that can be used for providing a gasket or other seal. Bolt holes 522 are also illustrated as extending completely through the differential pressure head 500 and are configured to receive bolts, studs, or nuts 274 illustrated in FIG. 13A.

As illustrated in FIGS. 14A-C, the pattern for the bolt holes 522 is "skewed" with respect to the impulse line connections 514 whereby the internal conduit 530 does not intersect with the holes 522. In such a configuration, conduit portion 534 is disposed at an angle with respect to the head face 506. Note that as some manifolds 252 place the transmitter 250 slightly offset from the manifold center, the skewing provided by the head 500 allows the transmitter 250 to be very nearly centered with respect to the impulse lines 254. This more evenly distributes the weight of the transmitter 250 and provides improved stability. The configuration is well-suited for manufacturing as well as provides ease of installation. Further, the studs and nuts which protrude from the rear of the head 500 are able to be torqued through a full 360° when a wrench is applied. Preferably sufficient material is provided in head 500 for piping class fittings to be socket welded per applicable code such as ASME B31.1/B31.3.

Figure 15A:
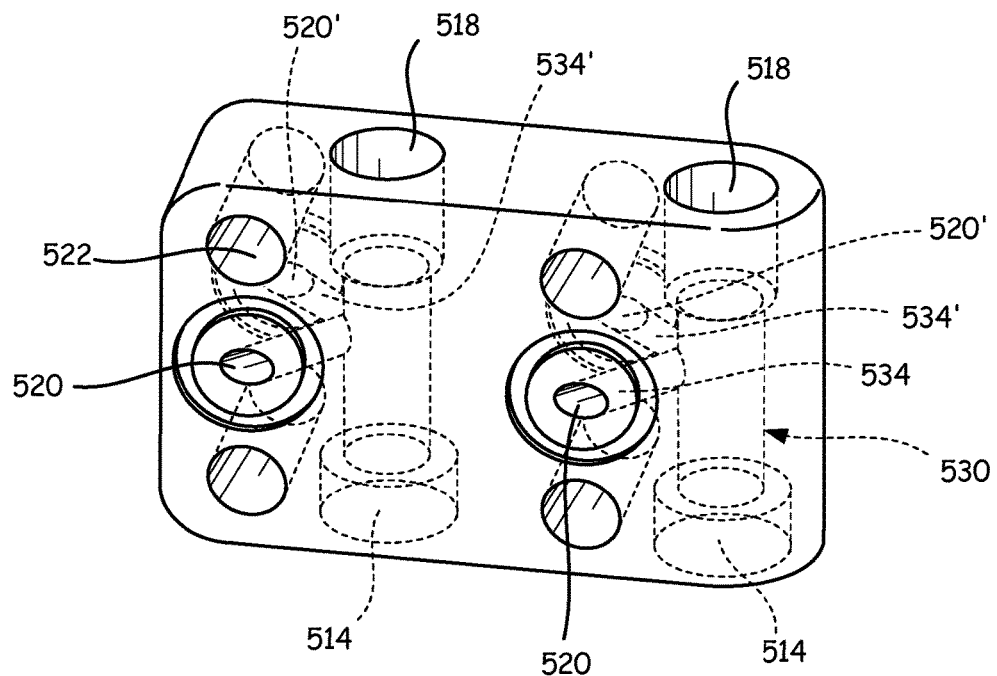
FIG. 15A is a side perspective view and FIG. 15B is a bottom plan view of a compact pressure transmitter coupling for use in coupling to two pressure transmitters.
Figure 15B:
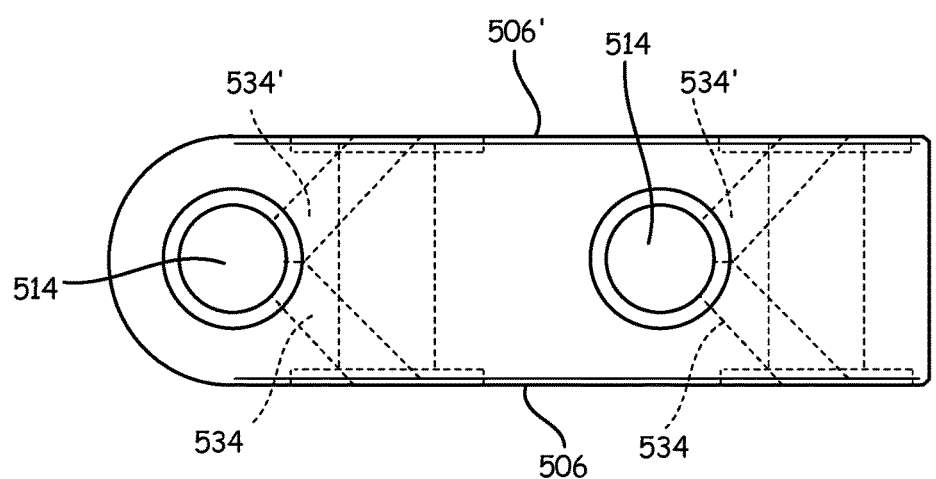
Figure 16A:
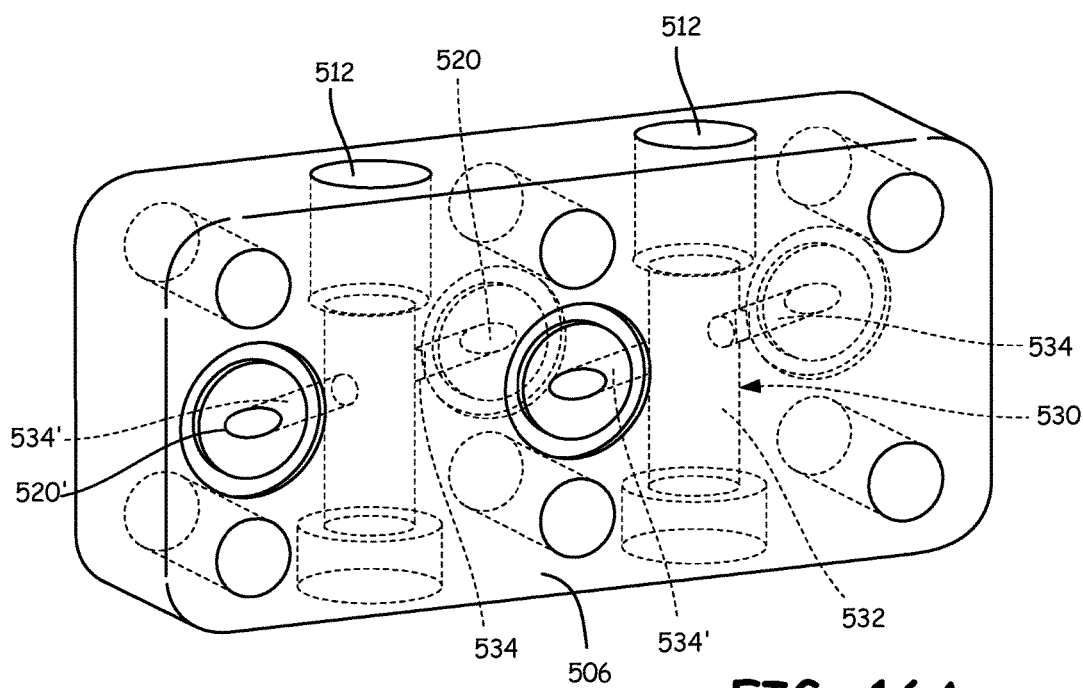
FIG. 16A is a side perspective view and FIG. 16B is a bottom plan view of a compact pressure transmitter coupling for use in coupling to two pressure transmitters.
Figure 16B:
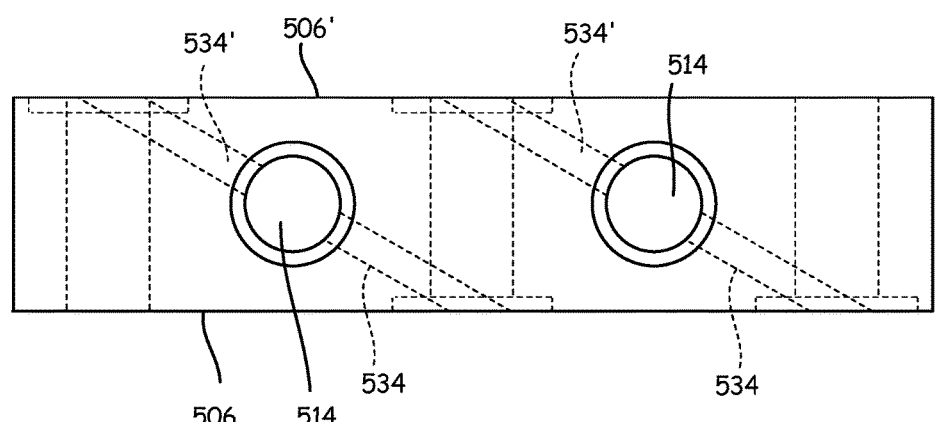

The compact manifold design can also be easily implemented in a mirror configuration such as that illustrated in FIGS. 15A-B and FIGS. 16A-B for coupling to two transmitters 250. The additional transmitter 250 can be used for providing a second measurement for redundancy, diagnostics, etc. This feature also allows for transmitter orientation flexibility. As illustrated in these figures, a second coupling face 506' is provided which is opposite coupling face 506 and includes ports 520' coupled to "T" connections 534'. In the configuration of FIGS. 15A, B, the ports 520, 520' are substantially aligned. In contrast, in the configuration illustrated in FIGS. 16A, B, the ports 520, 520' are laterally offset from one another. Further, additional bolt holes are provided in the configuration of FIGS. 16A, B for use in coupling to a second transmitter 250. Holes 520 can also be threaded to allow the unused pressure taps to be plugged.

Figure 17:
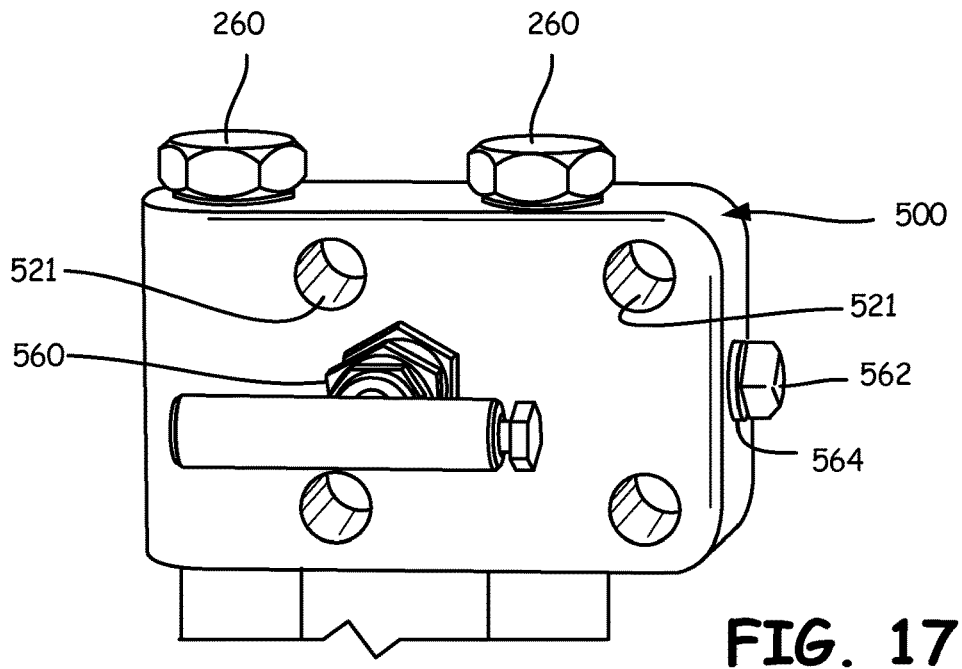
FIG. 17 is a perspective view of a compact pressure transmitter coupling including an equalizer valve.

An optional equalizer valve 560 may also be provided as illustrated in FIG. 17 to equalize pressure between the two passageways 530. In such a configuration, a bleed port 562 may also be provided and sealed with a plug 564.

Figure 18:
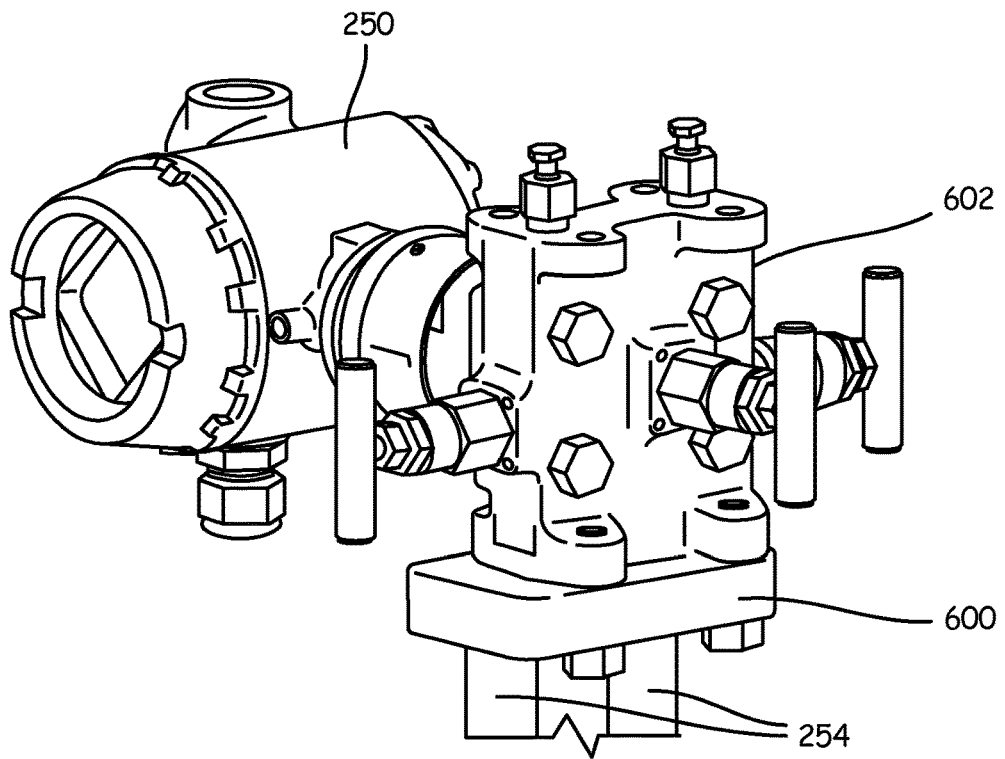
FIG. 18 is a perspective showing a non-rodable pressure transmitter coupling which provides a lateral offset to a pressure transmitter with respect to impulse tubing.

If desired, the skewed configuration provided by the differential pressure head 500 may also be implemented in a configuration which is not rodable such as head 600 illustrated in FIG. 18. In this configuration, head 600 connects to impulse tubing 254 and provides a lateral offset to a standard manifold 602. Transmitter 250 couples to the manifold 602 and is offset relative to manifold 602 and impulse tubing 254 in a direction which is opposite from the offset provided by head 600. This configuration, although not rodable, does provide the benefits of an offset design with respect to weight distribution and stability.

In various aspects, a differential pressure flow measurement primary element connection platform is provided which is configured for transferring the high side and low side pressures from impulse lines to a manifold or transmitter. Impulse connections preferably enter a head with center-to-center distance equivalent to that of flange taps, although other spacing may also be used. The head has a 90 degree turn to facilitate rodability and reduce moment-arm effects. Although 90 degrees is specifically illustrated, an angle may be employed which gives acceptable spacing. Rod ports are preferably threaded or otherwise sealed so they can be plugged when not in use. In one configuration, the head has a gap dimensioned to accommodate manifold fasteners (nuts, bolts, studs, etc.). The outlet pressure ports can be configured to mate with standard manifold pressure port spacing. Isolations valves are preferably added to the high and low pressure sides of the head.

Although the present invention has been described with reference to preferred embodiments, workers skilled in the art will recognize that changes may be made in form and detail without departing from the spirit and scope of the invention. In various aspects, larger diameter sensor ports are provided, rodable linear sensor ports are provided and offset heads for access to sensor ports. One configuration incorporates full port valves in an integrated flow meter. Further, the design allows the use of alternative materials such as hastalloy, super duplex, titanium, and others, due to the availability of generic raw materials and geometric simplicities of the welds.

What is claimed is:

1. A pressure transmitter coupling for coupling a pressure transmitter to a process fluid, comprising:
    a valved connection flange which carries the pressure transmitter;
    a valveless main body having a process coupling face having a process coupling port configured to couple to impulse piping;
    a connection flange coupling face arranged perpendicular to the process coupling face, the connection flange coupling face including a flange coupling port configured to fluidically couple to the valved connection flange which carries the pressure transmitter;
    a process fluid passageway extending between the process coupling port and the flange coupling port, wherein a portion of the process fluid passageway carried in the valveless main body extends perpendicular to the process coupling face; and
    a rod out port aligned with the process fluid coupling port configured to receive a cleaning rod therethrough to clean the process coupling port.

2. The pressure transmitter coupling of claim 1 wherein the process fluid passageway includes a straight portion coupled to the process coupling port and rod out port and "T" portion coupled to the flange coupling face and arranged at an angle with the process coupling face.

3. The pressure transmitter coupling of claim 1 wherein the angle comprises a 90 degree angle.

4. The pressure transmitter coupling of claim 1 including a bolt threadably received in the rod out port to thereby seal the rod out port.

5. The pressure transmitter coupling of claim 1 including a second flange coupling face arranged at an angle with the flange face, the second flange coupling face configured to couple to a second flange.

6. The pressure transmitter coupling of claim 1 wherein the valved connection flange includes at least one valve.

7. The pressure transmitter coupling of claim 1 wherein process coupling port is welded to impulse piping.

8. The pressure transmitter coupling of claim 1 wherein the flange coupling face includes four bolt holes configured to mount to a flange.

9. The pressure transmitter coupling of claim 1 including a second rod out port aligned with the flange port.

10. The pressure transmitter coupling of claim 1 wherein the process fluid coupling port and the flange coupling port are laterally offset.

11. The pressure transmitter coupling of claim 1 including a second process coupling port, a second flange coupling port, and a second process fluid passageway extending therebetween and a second rod out port aligned with the second process coupling port.

12. The pressure transmitter coupling of claim 11 including an equalizer connection between the first and second passageways.

13. The sure transmitter coupling of claim 11 wherein a distance between the process coupling ports is the same as a distance between the flange coupling ports.

* * * * *